Oct. 11, 1949. J. M. PESTARINI 2,484,246
FLUORESCENT LAMPS FED BY DIRECT CURRENT
Filed Nov. 20, 1946

INVENTOR.
Joseph Maximus Pestarini
BY

Patented Oct. 11, 1949

2,484,246

UNITED STATES PATENT OFFICE 2,484,246

FLUORESCENT LAMP FED BY DIRECT CURRENT

Joseph Maximus Pestarini, Staten Island, N. Y.

Application November 20, 1946, Serial No. 710,975

7 Claims. (Cl. 315—167)

The invention relates to lighting systems utilizing fluorescent lamps. It is well known that for building up the electronic column of the fluorescent lamp, it is necessary to supply, at the start, a supplemental voltage above the normal operative voltage.

The fluorescent lamp may be supplied with alternating current or with direct current. The use of direct current is less tiring to the eyes.

An object of the invention is to provide an improved direct current machine for generating the supplemental voltage during the starting period of the lamp.

A further object of the invention is to provide an improved direct current machine for generating a total voltage including the supplemental starting voltage and the normal operating voltage for a fluorescent lamp system.

Further object of the invention is to provide means for automatic heating of the electrode of the fluorescent lamp using the current generated by an improved direct current machine wherein the heating time is limited to that necessary for the ignition of the fluorescent lamp.

Still another object of this invention is to provide an improved direct current machine in combination with switching means for controlling the operation of the machine during the starting period of the fluorescent lamp.

The invention will be understood with the aid of the following description of several embodiments of the invention as shown in the attached drawings.

Figure 1:
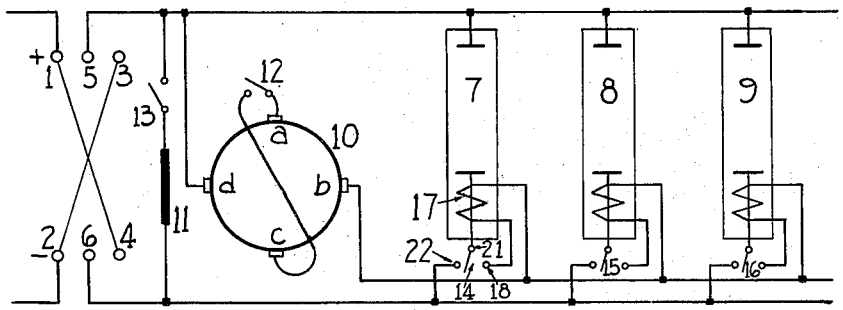
Figure 4:
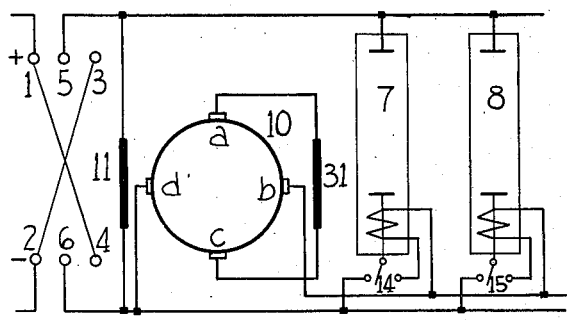
Figure 5:
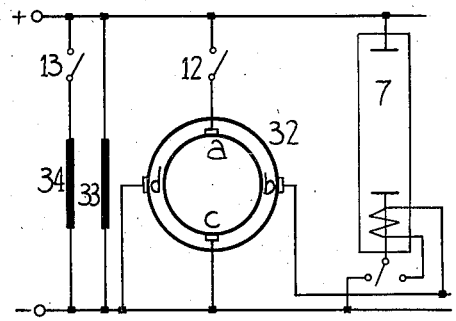
Figure 2:
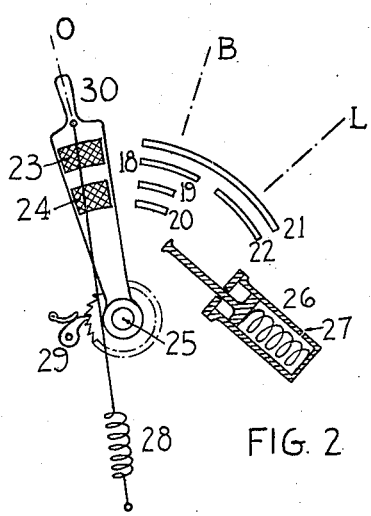
Figure 3:
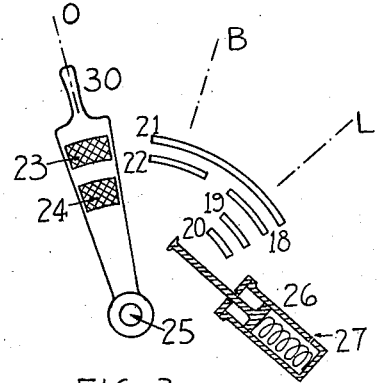

Figure 1 shows a scheme for a system embodying the invention and including a direct current machine. Figure 2 shows an arrangement of the detail of switchgear in the scheme of Figure 1. Figure 3 shows a modified form of the switchgear. Figure 4 shows another scheme of the system embodying the invention. Figure 5 shows another arrangement of the direct current machine shown in Figure 1.

The improved direct current machine utilized in the fluorescent lighting system described here comprises a metadyne as described in many United States patents by the applicant, see Patents Nos. 2,055,240, 1,937,417, 2,038,380, 2,049,389, and 2,079,465. A more complete description has been given in Revue Generale de l'Electricite, March 8th and 15th, August 16th and 23rd, November 22nd and 29th and December 6th, 1930, Paris.

The metadyne, used in this invention, may be a transformer metadyne or a generator metadyne. The transformer metadyne receives power from an electric source through primary brushes and transforms into electric power of another kind which is supplied to a consumer by secondary brushes. The generator metadyne transforms mechanical power into electric power which is supplied to a consumer.

Metadyne is the name now applied to the electric machine developed by the applicant as described in the foregoing patents, and originally referred to as transverse reaction machine.

Figure 1 shows the scheme of a general fluorescent lighting system embodying the invention. Terminals 1, 2, of a direct current constant voltage network may be connected to terminals 5 and 6 with a given current polarity through reversing switch points 3 and 4.

The fluorescent lamps 7, 8, 9, are connected to the constant voltage network for normal operation thereof. Means are provided for supplying a supplemental voltage to the lamp 7, 8 and 9 during the starting period thereof. To this end there is provided a metadyne 10 including primary brushes a, c, substantially short circuited through a switch 12 which is closed during the operation of the metadyne and secondary brushes b, d which may be connected to lamps 7, 8, 9. The metadyne 10 is provided with a stator winding 11, and a switch 13 in series therewith across the line for controlling the current generated by the metadyne.

A two way switch 14 in one position thereof connects one electrode of the lamp 7 to the line through contacts 21, 22. In the other position, switch 14 connects the electrode to the brush b of the metadyne 10 through contacts 21, 18. The resistor 17 heating the electrode of the lamp 7 is then traversed by the current supplied by the metadyne.

The electrodes and resistors in lamps 8 and 9 are similarly connected in circuit by means of two way switches 15, 16, respectively.

During the starting period of lamp 7, switches 12 and 13 are closed and the switch 14 is operated to connect the electrode of the lamp to the metadyne brush b. Immediately the metadyne will induce a suddenly increasing voltage sufficient to ionize the lamp. Immediately as the lamp is ionized, the voltage supplied by the metadyne drops to the normal operating voltage of the lamp, corresponding to the current supplied by the metadyne. According to the invention, the current traversing the stator winding 11 of the metadyne 10 is set at a value causing the intensity of the current supplied by the metadyne to be equal to the current traversing the lamp 7 while operating normally under the voltage of the network. Then the switch 14 may be operated to connect the electrodes of the lamp to the network for the normal operation of the lamp.

Lamps 8 and 9 may be operated in a similar manner by appropriate operation of switches 15, 16.

An initial heating of the electrodes of the lamps is usually required. This is readily obtained by the secondary current of the metadyne 10 traversing the resistor 17.

It is desirable that the polarity of the applied voltage be reversed from time to time. This is readily accomplished through the reversing switches indicated in contacts 1, 2, 3, 4, 5 and 6.

When the metadyne 10 is not in use and its secondary circuit is opened, the losses of the machine may be reduced by opening the switch 13 of its secondary variator winding 11 and thus disconnecting it from the main line or by opening the switch 12 which interrupts the primary circuit of the metadyne.

Figure 2 shows schematically a combined starting and operating switch for the correct operation of the system.

The switch comprises a handle 30 rotatable in a clockwise direction about an axis 25 and including spaced contact members 23, 24, which slidably engage fixed contact members 18, 19, 20, 21 and 22 upon movement of the handle about axis 25. The contact members 18, 21 and 22 correspond to similar contacts indicated in Figure 1. The contact members 19 and 20 correspond to contacts of switches 12 and 13. The switch further comprises a dash pot 26 provided with an outlet 27 for controlling the speed of movement of the handle 30 from a position B to position L. The handle 30 is prevented from rotating in a counter-clockwise direction by means of a ratchet 29. A spring 28 is connected to handle 30 in a manner to automatically urge the handle towards position L when the handle has been manually moved to position B.

When the handle 30 is in position O, the lamp is out of service. To initiate the lighting of the lamp, the handle 30 is moved about axis 25, to the position B wherein the contact members 21 and 18 are short circuited by the contact member 23. Simultaneously the contact members 19 and 20 are short circuited by the contact member 24.

Thus the lamp is inserted in the secondary circuit of the metadyne as previously described. The ionization of the lamp is quickly obtained and then the handle 30 may be moved from position B to position L for normal operation wherein the contact members 21, 22, are short circuited by contact member 23. It is noted that the contact member 23 is adapted to bridge the members 18 and 22 during movement of the handle 30 towards position L whereby the lamp is shifted from the secondary circuit of the metadyne 10 to the network without interruption of the impressed voltage.

It is also to be noted that the contact members 19 and 20 are of such dimensions compared to the contact member 18 as to allow for a reduction of the secondary current of the metadyne to zero before the secondary circuit is opened. Thus the operator must move the handle 30 from the position O to the position B, retaining the handle in this position a short time and then moving it to the postion L.

In order to simplify the operation of the switch, the handle 30 is moved automatically from the position B to the position L by means of spring 28 opposed by the dash pot 26.

For switching off the lamp, it is preferable that the handle 30 be moved in a clockwise direction from position L to position O, thus avoiding placing the metadyne in operation. The counter-clockwise movement of handle 30 is prevented by the ratchet 29.

Figure 3 shows another arrangement for the switch, whereby the same elements, indicated in Figure 2 by the same numerals, are utilized.

The operator in starting the operation brings handle 30 from the off position, indicated by O, to the building up position, indicated by B, and from this position, the shock absorber 26 brings it to the position L corresponding to the normal operation, the movement being slow enough to allow for the ignition.

The forms of the switches are given above only in order to show clearly the correct sequence of switch operation. The switch may be constructed in any other manner which provides the correct sequence of the contacts.

In the two forms of the switch, herein above described, the opening of either of the secondary variator winding circuit 11 or of the primary circuit of the metadyne is accomplished. One may simply open the secondary circuit of the metadyne and leave all other circuits intact. While this will result in some increase in losses in the metadyne, it simplifies the switches.

Figure 4 shows an arrangement whereby the metadyne generator 10 supplies its secondary voltage in addition to the normal voltage of the network, permitting thus the use of a smaller metadyne. The metadyne 10 in Figure 4 is shown provided with a stator winding 31 having its magnetic axis along the commutating axis of the secondary brushes $b$ and $d$ and being traversed by the primary current, inducing between the secondary brushes an electromotive force opposing the primary current. This allows for a reduction of the primary current when the secondary circuit is opened. This arrangement is particularly useful when the switch adopted, simply opens the secondary circuit of the metadyne and leaves all other circuits intact.

Figure 5 shows a similar scheme of the plant with a metadyne 32 operating as a transformer metadyne. The latter is shown provided with two separate armature windings. Each armature winding is connected to a separate commutator. One commutator bears the two primary brushes $a$ and $c$ and the other commutator bears the two secondary brushes $b$ and $d$.

The transformer metadyne 32 is shown provided with two stator windings 33 and 34. The winding 33, operating alone, is set to cause the secondary current to be zero and the winding 34 inserted by closing the switch 13 is set to cause by its ampere turns the creation of a secondary current having the necessary intensity required by the lamp in normal operation. Thus when the switch 13 is opened, the secondary current drops to zero.

On Figure 5 the transformer metadyne 32 is shown with its primary circuit connected to the network through the switch 12. The primary brushes may be connected to an independent source of current and in this case the armature may be provided with only one winding.

It will thus be seen that means are provided for inducing the peak of voltage necessary for the ignition of fluorescent lamps, for automatically reducing to zero said peak of voltage immediately after the ignition is achieved, for providing an automatic heating of the electrode just before the ignition and for automatically ceasing said heating as soon as the ignition is accomplished; it is further apparent that several variant arrangements are disclosed for the metadyne that creates said peak of voltage, and that various arrangements for the correct switchgear are provided, in which the several objects of the invention are achieved.

As various possible embodiments might be made of the above described invention, and as various changes might be made in the embodiments set forth, it is to be understood that all matter herein set forth or shown in the accompanying drawings, is to be interpreted as illustrative and not in a limited sense.

What I claim is:

1. In an electric lighting system, the combination of a direct current network, of a fluorescent lamp comprising electrodes and an ionized column between said electrodes, and a transverse reaction machine provided with primary and secondary pairs of brushes, means for connecting the electrodes of said fluorescent lamp to the secondary brushes of said transverse reaction machine whereby a peak voltage is applied between said electrodes during the ignition period of the ionized column, means for controlling the intensity of the current supplied by said transverse reaction machine to the lamp comprising a stator winding having its magnetic axis substantially coinciding with the commutating axis of said secondary brushes and set to cause said supplied current to be substantially equal to the current necessary for normal operation of said lamp whereby the peak of voltage induced between said electrodes drops to the normal operating voltage of the lamp at the termination of said ignition period and means for connecting the lamp to said network at the termination of said ignition period.

2. In an electric lighting system, the combination of a direct current network, of a fluorescent lamp comprising electrodes and an ionized column between said electrodes, and a transverse reaction machine provided with primary and secondary pairs of brushes, means for connecting the electrodes of said fluorescent lamp to the secondary brushes of said transverse reaction machine whereby a peak voltage is applied between said electrodes during the ignition period of the ionized column, means for controlling the intensity of the current supplied by said transverse reaction machine to the lamp comprising a stator winding having its magnetic axis substantially coinciding with the commutating axis of said secondary brushes and set to cause said supplied current to be substantially equal to the current necessary for normal operation of said lamp whereby the peak of voltage induced between said electrodes drops to the normal operating voltage of the lamp at the termination of said ignition period and means for connecting the lamp to said network at the termination of said ignition period, a resistor for heating said electrodes and means for connecting said resistor in the circuit supplied with current by said transverse reaction machine, means for successively switching said electrodes from the circuit supplied with current by said transverse reaction machine to said direct current network, and means for simultaneously disconnecting said stator windings of said transverse reaction machine from said direct current network.

3. In an electric lighting system, the combination of a direct current network, a fluorescent lamp comprising electrodes and an ionized column between said electrodes and a transverse reaction direct current generator provided with primary and secondary pairs of brushes and including stator windings, means for substantially short circuiting said primary brushes of said transverse reaction generator, means for connecting said lamp to the secondary brushes of said transverse reaction generator whereby a peak voltage is applied between said electrodes during the ignition period of the ionized column, means for controlling the intensity of the current supplied by said transverse reaction machine to the lamp comprising one of said stator windings having its magnetic axis substantially coinciding with the commutating axis of said secondary brushes and set to cause said supplied current to be substantially equal to the current necessary for normal operation of said lamp whereby the peak voltage induced between said electrodes drops to the normal operating voltage of the lamp at the termination of said ignition period and means for connecting the lamp to said network at the termination of said ignition period.

4. In an electric lighting system, the combination of a direct current network, a fluorescent lamp comprising electrodes and an ionized column between said electrodes and a transverse reaction direct current generator provided with primary and secondary pairs of brushes and including stator windings, means for substantially short circuiting said primary brushes of said transverse reaction generator through one of said windings inducing an electromotive force between said primary brushes opposing the current traversing said primary brushes, means for connecting said lamp to the secondary brushes of said transverse reaction generator whereby a peak voltage is applied between said electrodes during the ignition period of the ionized column, means for controlling the intensity of the current supplied by said transverse reaction machine to the lamp comprising another of said stator windings having its magnetic axis substantially coinciding with the commutating axis of said secondary brushes and set to cause said supplied current to be substantially equal to the current necessary for normal operation of said lamp, whereby the peak voltage induced between said electrodes drops to the normal operating voltage of the lamp at the termination of said ignition period and means for connecting the lamp to said network at the termination of said ignition period.

5. In an electric lighting system the combination of a direct current line, a fluorescent lamp comprising electrodes and an ionized column between said electrodes and a transverse reaction direct current generator provided with primary and secondary pairs of brushes and including stator windings, means for substantially short circuiting said primary brushes, means for connecting one of said secondary brushes to said line, means for connecting the other of said secondary brushes to one of said electrodes, means for connecting the other said electrodes to said line, whereby a peak voltage is applied between said electrodes during the ignition period of the ionized column, means for controlling the intensity of the current supplied by said transverse reaction machine to the lamp comprising one of said stator windings having its magnetic axis substantially coinciding with the commutating axis of said secondary brushes and set to cause said supplied current to be substantially equal to the current necessary for normal operation of said lamp whereby the peak voltage induced between said electrodes drops to the normal operating voltage of the lamp at the termination of said ignition period and means for connecting the lamp to said network at the termination of said ignition period.

6. In an electric lighting system, the combination of a direct current line, a fluorescent lamp comprising electrodes and an ionized column between said electrodes, and a transverse reaction direct current transformer provided with primary and secondary pairs of brushes, and including stator windings, means for connecting said primary brushes to said direct current network substantially at constant voltage, and means for connecting said secondary brushes to said electrodes whereby a peak voltage is applied between said electrodes during the ignition period of the ionized column, means for controlling the intensity of the current supplied by said transverse reaction machine to the lamp comprising one of said stator windings having its magnetic axis substantially coinciding with the commutating axis of said secondary brushes and set to cause said supplied current to be substantially equal to the current necessary for normal operation of said lamp, whereby the peak voltage induced between said electrodes drops to the normal operating voltage of the lamp at the termination of said ignition period and means for connecting the lamp to said network at the termination of said ignition period.

7. In an electric lighting system, the combination of a direct current line, a fluorescent lamp comprising electrodes and an ionized column between said electrodes and a transverse reaction direct current transformer comprising stator windings, primary and secondary pairs of brushes, a pair of armature windings and a pair of commutators, one of said commutators coacting with said primary brushes, the other of said commutators coacting with said secondary brushes, means for connecting said primary brushes to said direct current line and means for connecting one of said secondary brushes to said line and means for connecting the other of said secondary brushes to one of said electrodes and means for connecting the other electrode to the said line, whereby a peak voltage is applied between said electrodes during the ignition period of the ionized column, means for controlling the intensity of the current supplied to the lamp by said transverse reaction transformer comprising a pair of said stator windings having their magnetic axis substantially coincident with the commutating axis of said secondary brushes, one of said stator windings being set to cause said supplied current to be substantially equal to zero and the other of said stator windings being set to cause said supplied current to be substantially equal to the current necessary for normal operation of said lamp whereby the peak voltage induced between said electrodes drops to the normal operating voltage of the lamp at the termination of said ignition period and means for connecting the lamp to said network at the termination of said ignition period.

JOSEPH MAXIMUS PESTARINI.

REFERENCES CITED

The following references are of record in the file of this patent:

UNITED STATES PATENTS

| Number | Name | Date |
|---|---|---|
| 1,895,361 | Zecher et al. | Jan. 24, 1933 |
| 2,038,380 | Pestarini | Apr. 21, 1936 |